United States Patent
Choi et al.

(10) Patent No.: US 10,925,075 B2
(45) Date of Patent: Feb. 16, 2021

(54) METHOD AND APPARATUS FOR TRANSMITTING DATA ON RESOURCE UNIT INCLUDING PILOT TONE IN WLAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/448,964

(22) Filed: Jun. 21, 2019

(65) Prior Publication Data

US 2019/0313424 A1    Oct. 10, 2019

Related U.S. Application Data

(63) Continuation of application No. 15/517,507, filed as application No. PCT/KR2015/010570 on Oct. 6, 2015, now Pat. No. 10,375,708.

(Continued)

(51) Int. Cl.
*H04W 72/12* (2009.01)
*H04L 5/00* (2006.01)
(Continued)

(52) U.S. Cl.
CPC .......... *H04W 72/12* (2013.01); *H04L 1/0071* (2013.01); *H04L 5/00* (2013.01); *H04L 5/0048* (2013.01);
(Continued)

(58) Field of Classification Search
CPC ... H04L 5/0037; H04L 5/0044; H04L 5/0048; H04L 5/0053; H04L 27/2601; H04L 27/2602; H04L 27/2608; H04L 27/2675
See application file for complete search history.

(56) References Cited

U.S. PATENT DOCUMENTS 6,947,530 B1    9/2005   Barsoum
9,258,178 B2    2/2016   Zhang
(Continued)

FOREIGN PATENT DOCUMENTS

CN    101682406    3/2010
CN    102468951    5/2012
(Continued)

OTHER PUBLICATIONS

U.S. Appl. No. 15/517,507, Final Office Action dated Dec. 20, 2018, 11 pages.
(Continued)

*Primary Examiner* — Eric Nowlin
(74) *Attorney, Agent, or Firm* — Lee Hong Degerman Kang Waimey

(57) ABSTRACT

An access point device and method for: generating and transmitting a physical layer protocol data unit (PPDU) including a plurality of resource units on a bandwidth, where the plurality of resource units includes a first tone unit and a second tone unit. The first tone unit includes a total of 26 tones, where 2 pilot tones for the first tone unit are included in the total of 26 tones. The second tone unit includes a plurality of tones being greater than the total of 26 tones. The 4 pilot tones for the second tone unit are included in the plurality of tones. The locations of a plurality of pilot tones for the plurality of resource units are fixed when two first tone units are included in the plurality of resource units in place of the second tone unit.

12 Claims, 11 Drawing Sheets

26-tone resource unit (600)

pilot spacing /position in a 26 size 56-tone resource unit (650)

pilot spacing /position in a 56 size

Related U.S. Application Data

(60) Provisional application No. 62/063,931, filed on Oct. 14, 2014, provisional application No. 62/060,018, filed on Oct. 6, 2014.

(51) Int. Cl.
  *H04L 27/26* (2006.01)
  *H04L 1/00* (2006.01)
  *H04W 84/12* (2009.01)
  *H04W 88/08* (2009.01)

(52) U.S. Cl.
  CPC ............. *H04L 27/26* (2013.01); *H04W 84/12* (2013.01); *H04W 88/08* (2013.01)

(56) References Cited

U.S. PATENT DOCUMENTS

| | | | |
|---|---|---|---|
| 9,647,873 | B2 | 5/2017 | Zhang |
| 9,722,740 | B2 | 8/2017 | Suh et al. |
| 9,774,425 | B2 | 9/2017 | Oh et al. |
| 9,774,428 | B2 | 9/2017 | Montreuil et al. |
| 9,774,481 | B2 | 9/2017 | Yang et al. |
| 9,844,028 | B2 | 12/2017 | Yang et al. |
| 9,854,580 | B2 | 12/2017 | Yang et al. |
| 9,948,486 | B2 | 4/2018 | Wang et al. |
| 9,954,711 | B2 | 4/2018 | Porat |
| 9,967,877 | B2 | 5/2018 | Seok |
| 10,003,441 | B2 | 6/2018 | Montreuil et al. |
| 10,057,899 | B2 | 8/2018 | Lee et al. |
| 10,117,254 | B2 | 10/2018 | Yang et al. |
| 10,237,839 | B2 * | 3/2019 | Yang ................ H04L 27/2613 |
| 10,285,149 | B2 * | 5/2019 | Yang .................... H04W 72/04 |
| 10,298,304 | B2 * | 5/2019 | Lim ....................... H04B 7/066 |
| 2008/0025267 | A1 | 1/2008 | Wei et al. |
| 2010/0002787 | A1 | 1/2010 | Choi et al. |
| 2011/0255620 | A1 | 10/2011 | Jones, IV et al. |
| 2012/0039406 | A1 | 2/2012 | Srinivasa et al. |
| 2013/0202001 | A1 | 8/2013 | Zhang |
| 2013/0208822 | A1 | 8/2013 | Zhang et al. |
| 2013/0266086 | A1 | 10/2013 | Yang et al. |
| 2014/0169356 | A1 | 6/2014 | Noh et al. |
| 2015/0139119 | A1 * | 5/2015 | Azizi .................. H04L 27/2601 370/329 |
| 2015/0312077 | A1 | 10/2015 | Porat |
| 2015/0334708 | A1 | 11/2015 | Lee et al. |
| 2015/0365922 | A1 | 12/2015 | Suh et al. |
| 2016/0050666 | A1 | 2/2016 | Yang et al. |
| 2016/0073387 | A1 | 3/2016 | Yang et al. |
| 2016/0080122 | A1 | 3/2016 | Oh et al. |
| 2016/0088600 | A1 | 3/2016 | Yang et al. |
| 2016/0156499 | A1 | 6/2016 | Zhang |
| 2016/0241369 | A1 | 8/2016 | Yang et al. |
| 2016/0242177 | A1 | 8/2016 | Seok |
| 2016/0295513 | A1 | 10/2016 | Moon et al. |
| 2016/0330000 | A1 | 11/2016 | Lee et al. |
| 2016/0330300 | A1 | 11/2016 | Josiam et al. |
| 2016/0359595 | A1 | 12/2016 | Montreuil et al. |
| 2016/0359598 | A1 | 12/2016 | Montreuil et al. |
| 2016/0365955 | A1 * | 12/2016 | Yang .................... H04B 7/0456 |
| 2016/0366659 | A1 * | 12/2016 | Yang .................... H04B 7/0452 |
| 2017/0034829 | A1 | 2/2017 | Yang et al. |
| 2017/0126453 | A1 | 5/2017 | Montreuil et al. |
| 2017/0156148 | A1 | 6/2017 | Park et al. |
| 2017/0223722 | A1 | 8/2017 | Choi et al. |
| 2017/0230213 | A1 | 8/2017 | Wang et al. |
| 2017/0288825 | A1 | 10/2017 | Suh et al. |
| 2017/0317796 | A1 | 11/2017 | Lan et al. |
| 2017/0338910 | A1 | 11/2017 | Chun et al. |
| 2017/0338927 | A1 | 11/2017 | Park et al. |
| 2017/0338928 | A1 | 11/2017 | Park et al. |
| 2018/0219714 | A1 | 8/2018 | Porat |
| 2018/0220357 | A1 | 8/2018 | Kim et al. |
| 2018/0227913 | A1 | 8/2018 | Seok |
| 2018/0242355 | A1 | 8/2018 | Lou et al. |
| 2018/0270030 | A1 | 9/2018 | Montreuil et al. |
| 2018/0317128 | A1 | 11/2018 | Chun et al. |
| 2018/0323837 | A1 | 11/2018 | Park et al. |
| 2018/0324800 | A1 | 11/2018 | Lee et al. |
| 2019/0200314 | A1 * | 6/2019 | Tian ..................... H04L 5/0048 |

FOREIGN PATENT DOCUMENTS

| | | | |
|---|---|---|---|
| CN | 104094571 | | 10/2014 |
| CN | 106716893 | | 5/2017 |
| CN | 104094571 | | 3/2018 |
| EP | 2813042 | | 12/2014 |
| EP | 3142262 | A1 * | 3/2017 ........... H04B 7/0619 |
| EP | 3180879 | | 6/2017 |
| EP | 3214813 | | 9/2017 |
| EP | 3364545 | | 8/2018 |
| JP | 2017525191 | | 8/2017 |
| JP | 6314342 | | 4/2018 |
| KR | 20140135157 | | 11/2014 |
| KR | 20170044642 | | 4/2017 |
| WO | 2013/073921 | | 5/2013 |
| WO | 2013119829 | | 8/2013 |
| WO | 2015192047 | | 12/2015 |
| WO | 2016025817 | | 2/2016 |
| WO | 2017136017 | | 8/2017 |
| WO | WO-2019235787 | A1 * | 12/2019 ............ H04W 72/04 |

OTHER PUBLICATIONS

U.S. Appl. No. 15/517,507, Office Action dated Jul. 12, 2018, 29 pages.
Lee et al., "Pilot Design for 11ax," May 2015, IEEE, doc.: IEEE 802.11-15/0577r1, 8 pages.
Vermani et al., "Pilot Design for Data Section," Jul. 2015, IEEE, doc.: 802.11-15/0812r1, 16 pages.
Yang et al., "11 ax OFDMA Tone Plan Leftover Tones and Pilot Structure," Jul. 2015, IEEE, doc.: IEEE 802.11-15/0819r1, 32 pages.
Noh et al., "Pilot Design for 11ax Downlink Transmissions," Jul. 2015, IEEE, doc.: IEEE 802.11-15/0824r0, 19 pages.
Jinsoo Choi, et al., LG Electronics, "Discussion on OFDMA in HEW," IEEE 11-13/1382r0, Nov. 11, 2013, 11 pgs.
PCT International Application No. PCT/KR2015/010570, International Search Report dated Jan. 14, 2016, 6 pages.
State Intellectual Property Office of the People's Republic of China Application Serial No. 201580060431.X, Office Action dated Sep. 2, 2019, 8 pages.
Japan Patent Office Application No. 2017-518531, Office Action dated Apr. 26, 2018, 5 pages.
European Patent Office Application Serial No. 15849604.2, Search Report dated May 4, 2018, 10 pages.

* cited by examiner

Total 18 pilots with 2 BTUs and 5 STUs Total 8 pilots
(2 form each BTU and 1 from each STU except center STU)

virtual allocation
resource unit
(3BTU+3STU)

odd index
pilot tone even index
pilot tone virtual allocation
resource unit
(9STU)

odd index
pilot tone even index
pilot tone

METHOD AND APPARATUS FOR TRANSMITTING DATA ON RESOURCE UNIT INCLUDING PILOT TONE IN WLAN

CROSS-REFERENCE TO RELATED APPLICATIONS

This application is a continuation of U.S. patent application Ser. No. 15/517,507, filed on Apr. 6, 2017, now U.S. Pat. No. 10,375,708, which is the National Stage filing under 35 U.S.C. 371 of International Application No. PCT/KR2015/010570, filed on Oct. 6, 2015, which claims the benefit of U.S. Provisional Application No. 62/060,018, filed on Oct. 6, 2014 and 62/063,931, filed on Oct. 14, 2014, the contents of which are all hereby incorporated by reference herein in their entirety.

BACKGROUND OF THE INVENTION

Field of the Invention

The present invention relates to wireless communication, and more particularly, to a method and apparatus for transmitting data on a resource unit including a pilot tone in a wireless local area network (WLAN).

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present invention provides a method of transmitting data on a resource unit including a pilot tone in a wireless local area network (WLAN).

The present invention also provides a wireless device for performing a method of transmitting data on a resource unit including a pilot tone in a WLAN.

According to one aspect of the present invention, there is provided a method of transmitting data on a resource unit including a pilot tone in a WLAN. The method may include: scheduling, by an access point (AP), each of a plurality of wireless resources for communicating with a plurality of stations (STAs) on a bandwidth; and transmitting, by the AP, a plurality of pieces of downlink data to each of the plurality of STAs through each of the plurality of wireless resources. At least one wireless resource among the plurality of wireless resources may be a virtual allocation resource unit. The virtual allocation resource unit may be a combination of at least one first resource unit and at least one second resource unit including a plurality of data tones that can be interleaved by one interleaver. A set of positions of a plurality of first pilot tones included in the virtual allocation resource unit may be included in a set of positions of a plurality of second pilot tones included in at least one first resource unit and at least one second resource unit.

According to another aspect of the present invention, there is provided an AP for transmitting data on a resource unit including a pilot tone in a WLAN. The AP may include: a radio frequency (RF) unit for transmitting and receiving a radio signal; and a processor operatively coupled to the RF unit. The processor may be configured for: scheduling each of a plurality of wireless resources for communicating with a plurality of STAs on a bandwidth; and transmitting a plurality of pieces of downlink data to each of the plurality of STAs through each of the plurality of wireless resources. At least one wireless resource among the plurality of wireless resources may be a virtual allocation resource unit. The virtual allocation resource unit may be a combination of a plurality of resource units including a plurality of data tones that can be interleaved by one interleaver. A set of positions of a plurality of first pilot tones included in the virtual allocation resource unit may be included in a set of positions of a plurality of second pilot tones included in the plurality of resource units.

When a wireless resource is allocated for each of a plurality of stations (STAs) on the basis of orthogonal frequency division multiple access (OFDMA), a resource may be allocated to each of the plurality of STAs by using a wireless resource unit having a different size by definition. Accordingly, scheduling flexibility may be increased, and a throughput of a wireless local area network (WLAN) may be increased.

DESCRIPTION OF EXEMPLARY EMBODIMENTS

Figure 1:
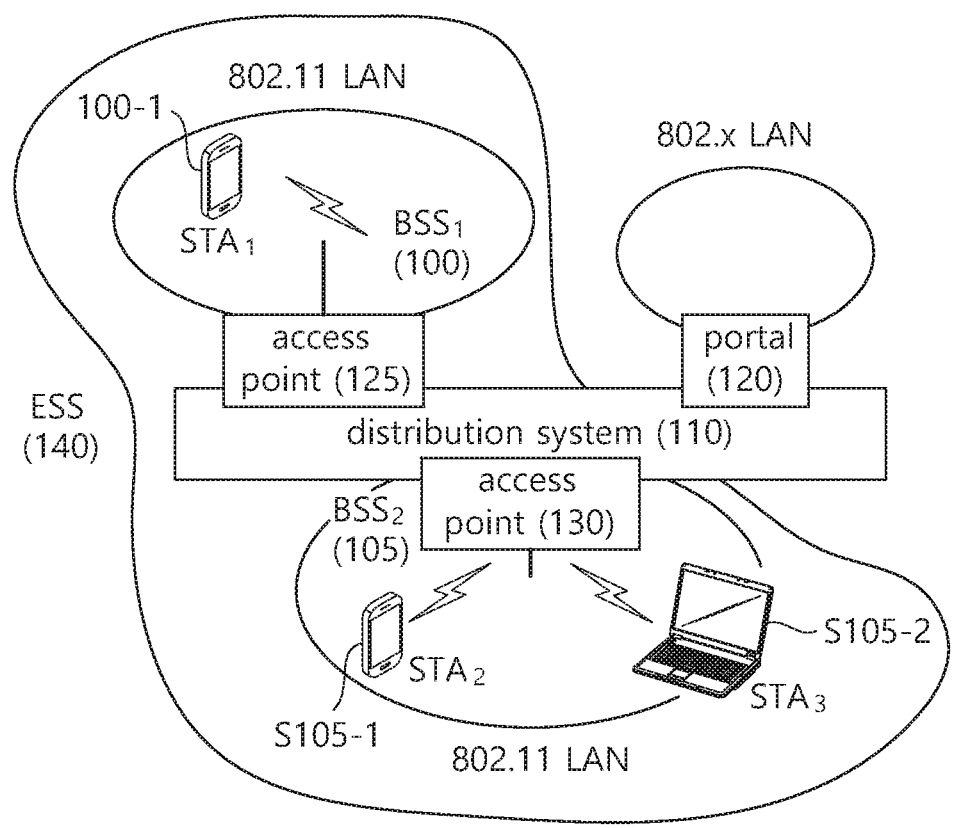
FIG. 1 is a conceptual view illustrating the structure of a wireless local area network (WLAN).
Figure 1:
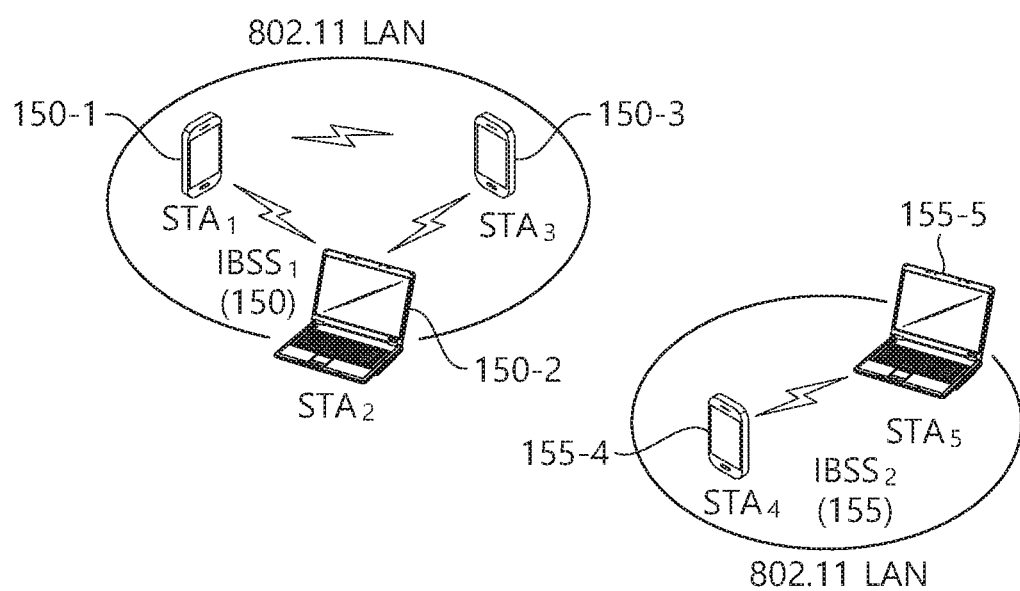

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the Wireless LAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4 (=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

When an OFDMA-based resource allocation method according to an embodiment of the present invention is used, the resource allocation unit defined by different sizes may be used. Specifically, a basic tone unit (BTU) and a small tone unit (STU) may be defined for the resource allocation based on the OFDMA.

The AP may determine DL transmission resource and/or UL transmission resource for at least one STA based on such various resource units. The AP may transmit at least one PPDU to at least one STA through the scheduled DL transmission resource. Further, the AP may receive at least one PPDU transmitted by at least one STA through the DL transmission resource.

In comparison with the STU, the BTU may be a relatively larger size resource unit. For example, the BTU may be defined as the size of 56 tones, 114 tones or the like. The BTU may be defined as the same size irrespective of the size of the available bandwidth (e.g., 20 MHz, 40 MHz, 80 MHz, 160 MHz, etc.) or defined as a size which is changed depending on the size of the available bandwidth. For example, the size of the BTU may be defined as a relatively large value as the size of the available bandwidth increases. The tone may be understood as the same as the subcarrier.

In comparison with the BTU, the STU may be a relatively small size resource unit. For example, the STU may be defined as the size of 26 tones.

Resource units such as BTU and STU may be allocated on the entire bandwidth (or available bandwidth) in consideration of the left guard tone and the right guard tone which are located at both ends of the entire bandwidth and are used to reduce interference, and the direct current (DC) tone located in the center of the entire bandwidth. Further, the resource units such as BTU and STU may be allocated in consideration of a leftover tone which may be used for user allocation separation (or resource allocation for each STA), a common pilot, an automatic gain control (AGC), a phase tracking, etc.

In the entire bandwidth, the allocation method (allocated number, allocation location, etc) of the resource units such as BTU and STU on the entire bandwidth may be set in consideration of the resource utilization efficiency and the scalability (or extensibility) according to the entire bandwidth. The allocation method of resource units such as BTU and STU may defined in advance or signaled based on various methods (e.g., a signaling based on a signal field included in the PPDU header of the PPDU).

Hereinafter, a specific resource allocation method based on BTU and STU will be described.

Figure 2:
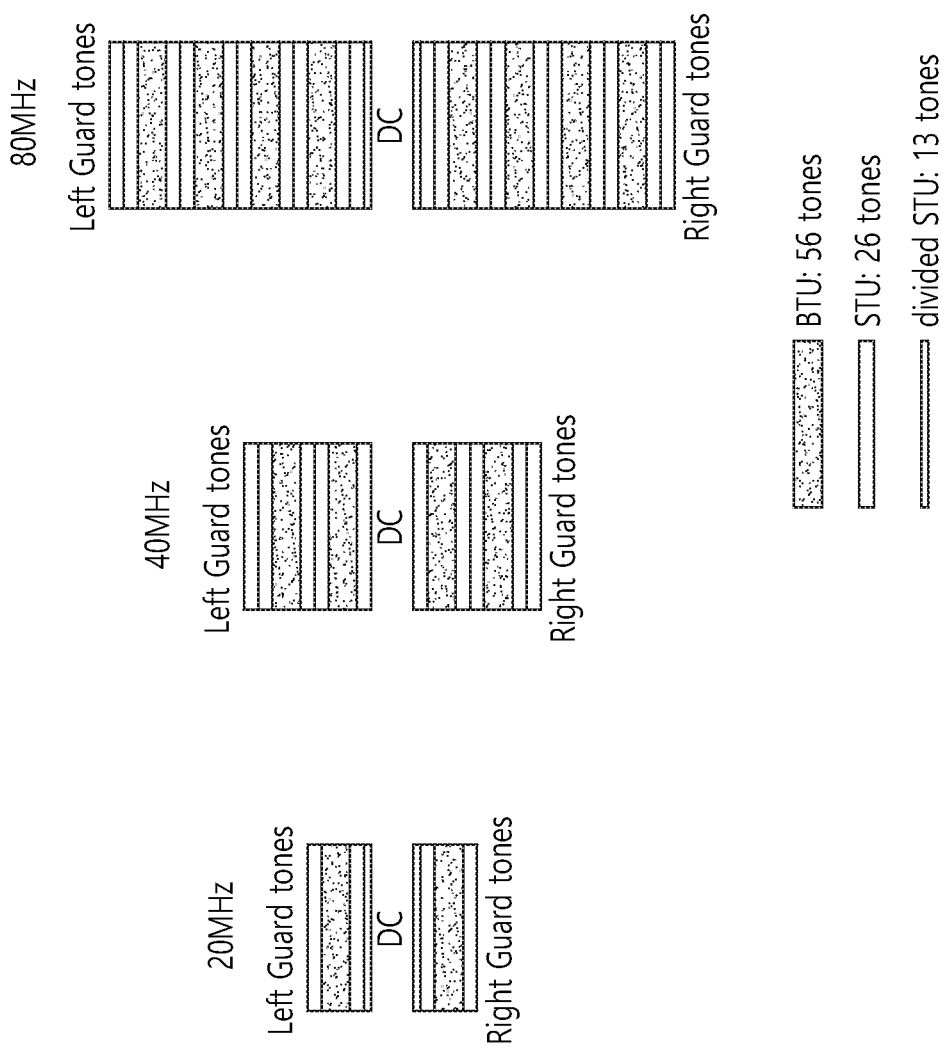
FIG. 2 is a conceptual view illustrating a method of allocating wireless resources according to an embodiment of the present invention.

FIG. 2 is a conceptual view illustrating a method of allocating wireless resources according to an embodiment of the present invention.

FIG. 2 discloses resource allocation for all available bandwidths based on BTU and STU.

Table 1 below discloses the basic resource allocation of BTU and STU on bandwidths of 20 MHz, 40 MHz, and 80 MHz.

TABLE 1

|  | 20 MHz | 40 MHz | 80 MHz |
|---|---|---|---|
| Basic tone unit (BTU) | 56 tones | 56 tones | 56 tones |
| Small tone unit (STU) |  | 26 tones |  |
| Total # of BTUs | 2 | 4 | 8 |
| Total # of STUs | 5 | 10 | 21 |
| Total available tones (except guard/DC tones) | 242 tones | 484 tones | 994 tones |
| Possible # of BTUs allocated to a STA | 1, 2 | 1, 2 | 1, 2, 4 |
| Possible # of STUs allocated to a STA | 1, 2, 4, 5 | 1, 2, 4, 10 | 1, 2, 4, 21 |
| Maximum STA # of allocations | 7 | 14 | 29 |

Referring to FIG. 2 and Table 1, BTU may be defined as 56 tones, and STU may be defined as 26 tones. One STU may be implemented as two divided STUs corresponding to 13 tons based on the DC tone.

2 BTUs and 5 STUs may be allocated for 20 MHz bandwidth including 242 available tones. Further, 4 BTUs and 10 STUs may be allocated for 40 MHz bandwidth including 484 available tones, and 8 BTUs and 21 STUs may be allocated for 80 MHz bandwidth including 994 available tones.

1 or 2 BTUs may be allocated with one STA for 20 MHz bandwidth. Further, 1 or 2 BTUs may be allocated with 1 STA for 40 MHz bandwidth, and 1, 2 or 4 BTUs may be allocated with 1 STA for 80 MHz bandwidth.

1, 2, 4 or 5 STUs may be allocated with 1 STA for 20 MHz bandwidth. The number 5, which is the maximum number of STUs allocatable with 1 STA on 20 MHz bandwidth, may be defined as another value in consideration of the signaling for the number of STUs allocated to one STA. Further, 1, 2, 4 or 10 STUs may be allocated with 1 STA for 40 MHz bandwidth. The number 10, which is the maximum number of STUs allocatable with 1 STA on 40 MHz bandwidth, may be defined as another number in consideration of the signaling for the number of STUs allocated with 1 STA. Further, 1, 2, 4 or 21 STUs may be allocated with 1 STA for 80 MHz bandwidth. The number 21, which is the maximum number of STUs allocatable with 1 STA on 80 MHz bandwidth, may be defined as another value in consideration of the signaling for the number of STUs allocated with 1 STA.

According to an embodiment of the present invention, a virtual allocation resource unit including a tone corresponding to a combination of at least one BTU and at least one STU may be defined, and a resource allocation based on the virtual allocation resource unit may be performed. The resource allocation based on the virtual allocation resource unit may also be called virtualization.

The virtual allocation resource unit may be a resource unit for reutilizing an interleaver size and OFDM numerology of the existing WLAN system. Further, the virtual allocation resource unit may be defined as a resource unit which is greater than that of BTU and STU and corresponds to the tone corresponding to the combination of at least one BTU and at least one STU. For example, the virtual allocation resource unit may be 242 tones which is the combination of 2 BTUs and 5 STUs and 484 tones which is the combination of 4 BTUs and 10 STUs.

Specifically, when 242 tones corresponding to 2 BTUs and 5 STUs are allocated to one STA, the existing pilot allocation and the existing interleaver size may be utilized. Specifically, the pilot tone may be allocated to 8 tones among 242 tones, and the data tone may be allocated to the remaining 234 tones. An interleaving based on the interleaver of 234 size may be performed for the 234 data tones.

In such a case, a data interleaving procedure and a pilot tone insertion procedure may be performed in the same manner as that of the existing STA having been allocated 242 tones. Namely, even when the 242 tone structure is not physically supported, the resource unit of one virtual 242 tones may be allocated to the STA. In such a case, the interleaving procedure which utilizes the existing interleaver of the 234 size and the insertion procedure of the existing pilot tones (8 pilot tones) may be used. Such a 242 tone resource unit may be expressed as the term "virtual allocation resource unit". The virtual allocation resource unit may be 242 tones or a multiple number of 242 tones (e.g., 484, 968, etc.). Further, the size of the virtual allocation resource unit may be determined based on another interleaver size (108, 52, 24, etc.) having been used in the existing WLAN system. Further, the virtual allocation resource unit may be defined as a resource unit greater than that of BTU and STU corresponding to the tone corresponding to the combination of at least one BTU and at least one STU and may include a plurality of data tones interleaved by a newly defined interleaver size.

Such a virtual allocation resource unit may be utilized for transmission based on SU (single) OFDMA. Further, all BTUs and all STUs defined in each bandwidth with respect to one STA may be allocated for transmission based on SU OFDMA.

The maximum number of STAs which may be simultaneously allocated resources in 20 MHz bandwidth may be 7. Each of the maximum 7 STAs may be allocated each of 2 BTUs and 5 STUs. The maximum number of STAs which may be allocated resources in 40 MHz bandwidth may be 14. Each of the maximum 14 STAs may be allocated each of 4 BTUs and 10 STUs. The maximum number of STAs which may be allocated resources in 80 MHz may be 29. Each of 29 STAs may be allocated each of 8 BTUs and 21 STUs. Further, the maximum number of STAs which may be allocated resources in the entire bandwidth may be limited to a number smaller than 29 (e.g., 20), and in such a case, the maximum 19 STAs may be simultaneously allocated resources based on the combination of 8 BTUs and 21 STUs in 80 MHz.

According to an embodiment of the present invention, a tone numerology may be assumed for a size of each bandwidth as follows. The following tone numerology is provided as one example, and thus a resource may be allocated on the basis of not only the tone numerology disclosed in the example but also various tone numerologies.

Six left guard tones, three DC tones, and five right guard tones may be assumed for a 20 MHz bandwidth, and an OFDMA tone structure may be configured on the basis of two 56-tone resource units (BTUs) and five 26-tone resource units (STUs). Alternatively, the resource may be allocated on the basis of a virtual allocation resource unit corresponding to nine 26-tone resource units. More specifically, the allocation of the two 56-tone resource units (BTUs) and the five 26-tone resource units (STUs) on the 20 MHz bandwidth may be based on: (1) left guard tone/56/26/26/13/DC/13/26/26/56/right guard tone; or (2) 26/26/13/56/DC/56/13/26/26/left guard tone. In this case, 13 tones may be a resource unit obtained by dividing a 26-tone resource unit.

Six left guard tones, nine DC tones, and five right guard tones may be assumed for a 40 MHz bandwidth. The remaining available 492 tones except the left guard tone, the DC tone, and the right guard tone may be divided into two parts with respect to the DC tone, and the two parts may respectively include three 56-tone resource units and three 26-tone resource units. More specifically, the resource allocation on the 40 MHz bandwidth may be based on a left guard tone/56/56/26/26/26/56/DC tone/56/26/26/26/56/56/right guard tone.

Alternatively, six left guards, five DC tones, and five right guard tones may be assumed for the 40 MHz bandwidth. Seven 56-tone resource units and four 26-tone resource units may be allocated for available 496 tones. More specifically, the resource allocation on the 40 MHz bandwidth may correspond to a left guard tone/56/56/26/26/56/28/DC/28/56/26/26/56/56/right guard tone. In this case, 26 tones may be a resource unit obtained by dividing a 56-tone resource unit.

11 left guard tones, 9 DC tones, and 5 right guard tones or 6 left guard tones, 13 DC guard tones, and 5 right guard tones may be assumed for an 80 MHz bandwidth. The remaining available 1000 tones except the left guard tone, the DC tone, and the right guard tone may be divided into four parts. Four units of 250 tones may be generated by dividing 1000 tones. For each of the four units of 250 tones, four 56-tone resource units and one 26-tone resource unit may be defined. That is, the 56-tone resource unit and one 26-tone resource unit may be allocated on one unit of 250 tones. Alternatively, the 56-tone resource unit may be divided into two 26-tone resource units, and in this case, the 250-tone resource unit may include nine 26-tone resource units. The nine 26-tone resource units may be defined as one virtual allocation resource unit.

More specifically, the resource allocation on the 80 MHz bandwidth may be based on a left guard tone/56/56/56/56/26/26/56/56/56/56/DC tone/56/56/56/56/26/26/56/56/56/56/56/right guard tone.

Hereinafter, a method of allocating a pilot tone in a resource unit is disclosed according to an embodiment of the present invention.

Figure 3:
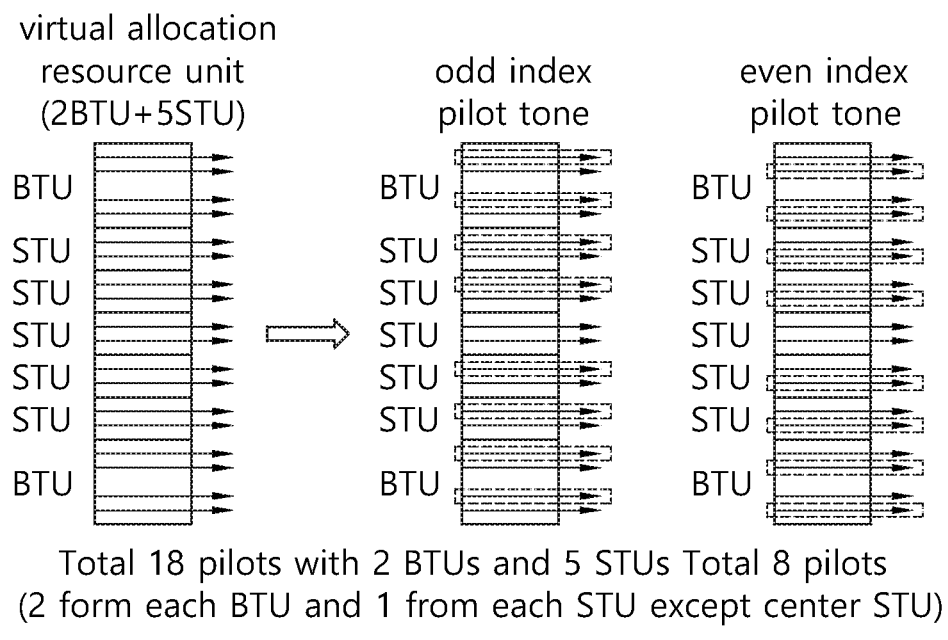
FIG. 3 is a conceptual view illustrating a method of allocating a pilot tone for a virtual allocation resource unit according to an embodiment of the present invention.
Figure 3:
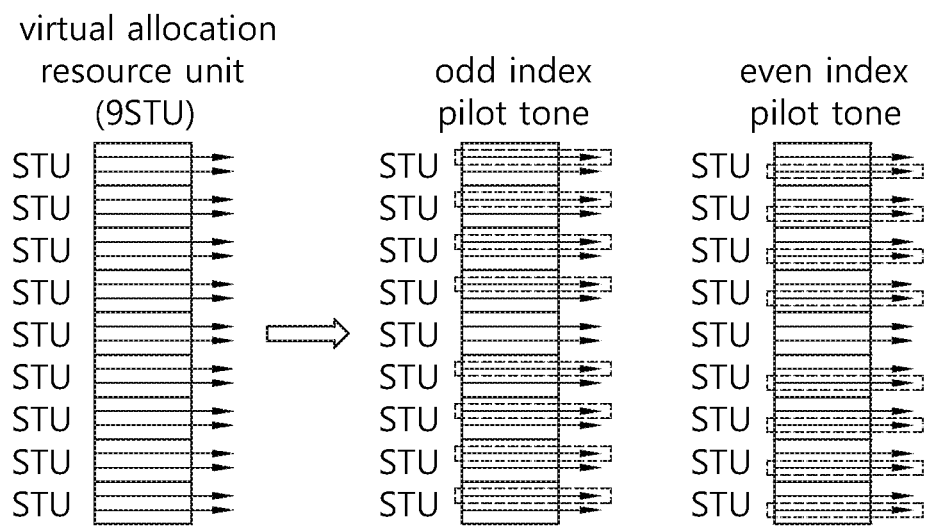

FIG. 3 is a conceptual view illustrating a method of allocating a pilot tone for a virtual allocation resource unit according to an embodiment of the present invention.

A method disclosed in FIG. 3 is a method of allocating a pilot tone in a virtual allocation resource unit by considering a position of a pilot tone of each of at least one BTU and at least one STU corresponding to the virtual allocation resource unit. The virtual allocation resource unit may not use the existing 242-tone based OFDM numerology in the allocation of the pilot tone.

Referring to FIG. 3, the virtual allocation resource unit of 242 tones may be allocated through virtualization, and the virtual allocation resource unit of 242 tones may correspond to a combination of 2 BTUs and 5 STUs. The BTU may be replaced with 2 STUs. That is, a band plan with a structure of 9 STUs in total may be configured, and this may be used as an allocation resource of 242 tones.

A position of a pilot tone included in a virtual allocation resource unit (e.g., 242 tones) according to an embodiment of the present invention may be the same as a position of all or some pilot tones among a plurality of pilot tones of at least one BTU (e.g., 2 BTUs) and at least one STU (e.g., 5 STUs) corresponding to the virtual allocation resource unit. When one BTU is replaced with two STUs, the position of the pilot tone included in the virtual allocation resource unit may be the same as the position of all or some pilot tones among a plurality of STUs corresponding to the virtual allocation resource unit.

In other words, a set of positions of pilot tones of the virtual allocation resource unit may be included in a set of positions of a plurality of pilot tones of at least one BTU (e.g., 2 BTUs) and at least one STU (e.g., 5 STUs) corresponding to the virtual allocation resource unit.

For example, one BTU may include 4 pilot tones, and one STU may include 2 pilot tones. In this case, the total number of pilot tones of the 2 BTUs and the 5 STUs may be 18 (=2*4+5*2). Positions of 8 pilot tones out of the 18 pilot tones may be the same as (or overlap with) positions of 8 pilot tones included in the virtual allocation resource unit of 242 tones.

As shown in FIG. 3, positions of 4 pilot tones out of 8 pilot tones included in the 2 BTUs may be the same as positions of 4 pilot tones of the virtual allocation resource unit. The 4 pilot tones included in the 2 BTUs having the same position as the position of the pilot tone of the virtual allocation resource unit may be an even pilot tone (or an even index pilot tone). Alternatively, the 4 pilot tones included in the 2 BTUs having the same position as the position of the pilot tone of the virtual allocation resource unit may be an odd pilot tone (or an odd index pilot tone). Alternatively, the 4 pilot tones included in the 2 BTUs having the same position as the position of the pilot tone of the virtual allocation resource unit may be a combination of the even index pilot tones/odd index pilot tones.

The even index pilot tone (or even pilot tone) may be a pilot tone located at an even position with respect to a leftmost tone or a rightmost tone among pilot tones included in a resource unit (BTU, STU), and the odd index pilot tone (or odd pilot tone) may be a pilot tone located at an odd position with respect to a specific frequency position among the pilot tones included in the resource unit.

In addition, positions of 4 pilot tones out of 8 pilot tones included in 4 STUs may be the same as positions of 4 pilot tones of the virtual allocation resource unit. The 4 pilot tones included in 4 STUs having the same position as the position of the pilot tone of the virtual allocation resource unit may be even index pilot tones. Alternatively, the 4 pilot tones included in 4 STUs having the same position as the position of the pilot tone of the virtual allocation resource unit may be odd index pilot tones. Alternatively, the 4 pilot tones included in 4 STUs having the same position as the position of the pilot tone of the virtual allocation resource unit may be a combination of the even index pilot tones/odd index pilot tones.

Positions of 2 pilot tones included in the remaining one STU may not be the same as the position of the pilot tone of the virtual allocation resource unit. The remaining one STU may be a central STU located at the center on 242 tones.

That is, as described above, positions of 8 pilot tones out of 18 pilot tones of the 2 BTUs and the 5 STUs may be the same as positions of 8 pilot tones included in the virtual allocation resource unit of 242 tones.

In addition, if one BTU consists of 2 STUs, positions of 8 pilots out of 18 pilot tones of 9 STUs may be the same as positions of 8 pilot tones included in the virtual allocation resource unit of 242 tones.

Figure 4:
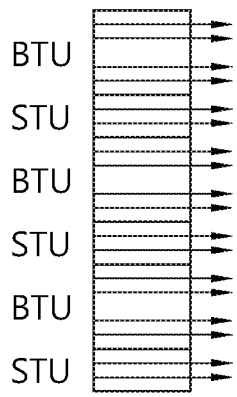
FIG. 4 is a conceptual view illustrating a method of allocating a pilot tone for a virtual allocation resource unit according to an embodiment of the present invention.
Figure 4:
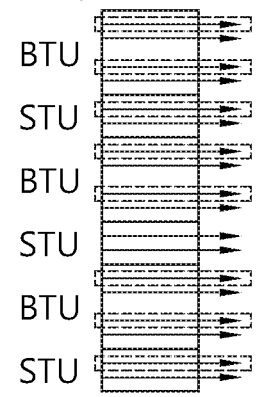
Figure 4:
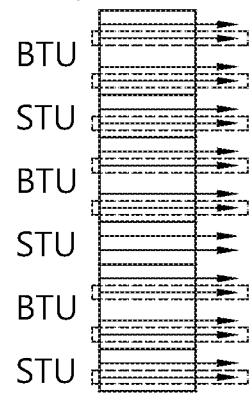
Figure 4:
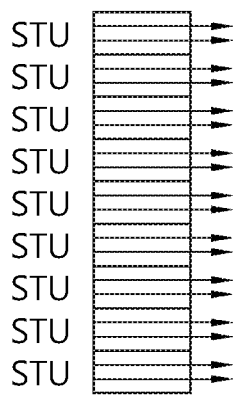
Figure 4:
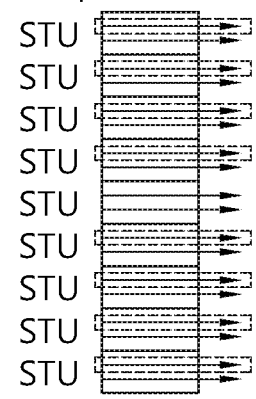
Figure 4:
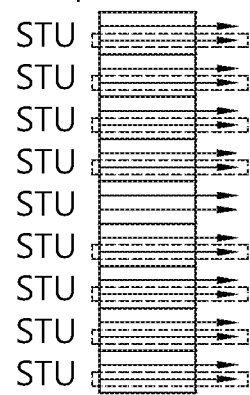

FIG. 4 is a conceptual view illustrating a method of allocating a pilot tone for a virtual allocation resource unit according to an embodiment of the present invention.

A method disclosed in FIG. 4 is a method of allocating a pilot tone in a virtual allocation resource unit by considering a position of a pilot tone of each of at least one BTU and at least one STU corresponding to the virtual allocation resource unit. That is, the virtual allocation resource unit may not use the existing 242-tone based OFDM numerology in the allocation of the pilot tone.

Referring to FIG. 4, the virtual allocation resource unit of 246 tones may be allocated through virtualization, and the virtual allocation resource unit of 246 tones may be a combination of 3 BTUs and 3 STUs. In the virtual allocation resource unit of 246 tones, only 242 tones may be used as data tones and pilot tones, and 4 tones may be the remaining tones (or leftover tones). Therefore, an interleaving procedure for the data tone utilizing the existing interleaver of a 234 size may also be used for the virtual allocation resource unit of 246 tones.

According to an embodiment of the present invention, a position of a pilot tone included in a virtual allocation resource unit (e.g., 246 tones) may be the same as a position of all or some pilot tones among a plurality of pilot tones of at least one BTU (e.g., 3 BTUs) and at least one STU (e.g., 3 STUs) corresponding to the virtual allocation resource unit. In other words, a set of positions of pilot tones of the virtual allocation resource unit may be included in a set of positions of a plurality of pilot tones of at least one BTU (e.g., 3 BTUs) and at least one STU (e.g., 3 STUs) corresponding to the virtual allocation resource unit.

For example, one BTU may include 4 pilot tones, and one STU may include 2 pilot tones. In this case, the total number of pilot tones of the 3 BTUs and the 3 STUs may be 18 (=3*4+3*2). Positions of 8 pilot tones out of the 18 pilot tones may be the same as (or overlap with) positions of 8 pilot tones included in the virtual allocation resource unit of 246 tones.

As shown in FIG. 4, positions of 6 pilot tones out of 12 pilot tones included in the 3 BTUs may be the same as positions of 6 pilot tones of the virtual allocation resource unit. 6 pilot tones included in the 3 BTUs having the same position as the position of the pilot tone of the virtual allocation resource unit may be even index pilot tones. Alternatively, the 6 pilot tones included in the 3 BTUs having the same position as the position of the pilot tone of the virtual allocation resource unit may be odd index pilot tones. Alternatively, the 6 pilot tones included in the 3 BTUs having the same position as the position of the pilot tone of the virtual allocation resource unit may be a combination of the even index pilot tones/odd index pilot tones.

In addition, positions of 2 pilot tones out of 4 pilot tones included in 2 STUs may be the same as positions of 2 pilot tones of the virtual allocation resource unit. 2 pilot tones included in 2 STUs having the same position as the position of the pilot tone of the virtual allocation resource unit may be even index pilot tones. Alternatively, the 2 pilot tones included in 2 STUs having the same position as the position of the pilot tone of the virtual allocation resource unit may be odd index pilot tones. Alternatively, the 2 pilot tones included in 2 STUs having the same position as the position of the pilot tone of the virtual allocation resource unit may be a combination of the even index pilot tones/odd index pilot tones.

Positions of 2 pilot tones included in the remaining one STU may not overlap with the position of the pilot tone of the virtual allocation resource unit. The remaining one STU may be a central STU located at the center on 246 tones.

That is, as described above, positions of 6 pilot tones out of 18 pilot tones of the 3 BTUs and the 3 STUs may be set to be the same as positions of 8 pilot tones included in the virtual allocation resource unit of 246 tones.

If a position of a pilot tone is allocated as disclosed in FIG. 3 and FIG. 4, the position of the pilot may be fixed instead of varying depending on a change in a resource unit to be allocated, thereby providing convenience in implementation. For example, if a pilot tone of a virtual allocation resource unit corresponds to some pilot tones among pilot tones included in a BTU and STU that can be allocated in a bandwidth (in other words, if a position of the pilot tone of the virtual allocation resource unit corresponds to a position of some pilot tones among pilot tones included in the BTU and STU that can be allocated in the bandwidth or if a set of positions of pilot tones of the virtual allocation resource unit is included in a set of positions of some pilot tones among the pilot tones included in the BTU and STU that can be allocated in the bandwidth), a long training field (LTF)-based operation and a channel tracking operation may be easily implemented.

According to another embodiment of the present invention, a position of at least one pilot tone among a plurality of pilot tones included in the BTU and STU that can be allocated in the bandwidth may be set to be the same as the position of the pilot tone of the virtual allocation resource unit by considering an interpolation/extrapolation characteristic.

Alternatively, a position of at least one pilot tone among a plurality of pilot tones included in the BTU and STU that can be allocated in the bandwidth may be set to be the same as the position of the pilot tone of the virtual allocation resource unit by considering a structure of a training field supported in a WLAN system (an HE-LTF structure generated based on 4×IFFT).

Likewise, if the position of the pilot tone is allocated, the position of the pilot may be fixed instead of varying depending on a change in a resource unit to be allocated, thereby providing convenience in implementation. For example, if a pilot tone of a virtual allocation resource unit corresponds to some pilot tones among pilot tones included in a BTU and STU that can be allocated in a bandwidth (in other words, if a position of the pilot tone of the virtual allocation resource unit corresponds to a position of some pilot tones among pilot tones included in the BTU and STU that can be allocated in the bandwidth), a long training field (LTF)-based operation and a channel tracking operation may be easily implemented.

According to another embodiment of the present invention, a position of at least one pilot tone among a plurality of pilot tones included in the BTU and STU that can be allocated in the bandwidth may overlap with the position of the pilot tone of the virtual allocation resource unit by considering an interpolation/extrapolation characteristic.

Alternatively, a position of at least one pilot tone among a plurality of pilot tones included in the BTU and STU that can be allocated in the bandwidth may overlap with the position of the pilot tone of the virtual allocation resource unit by considering a structure of a training field supported in a WLAN system (an HE-LTF structure generated based on 4×IFFT).

Figure 5:
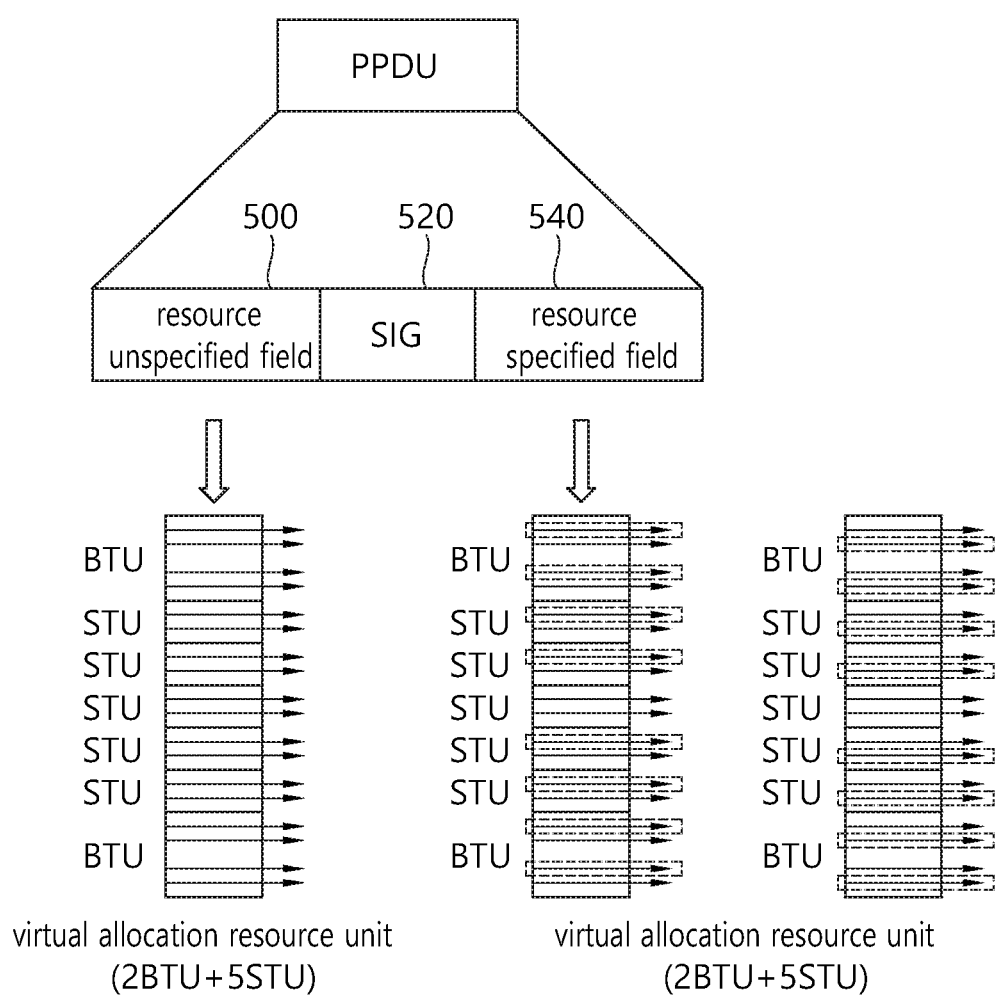
FIG. 5 is a conceptual view illustrating a method of allocating a pilot tone in a physical protocol data unit (PPDU) according to an embodiment of the present invention.

FIG. 5 is a conceptual view illustrating a method of allocating a pilot tone in a PPDU according to an embodiment of the present invention.

The pilot tone allocation method disclosed in FIG. 3 and FIG. 4 is applied to the PPDU of FIG. 5.

Among fields included in the PPDU, a field by which an STA must perform decoding without knowing whether a resource allocated to the STA is a virtual allocation resource or a BTU and/or an STU may be expressed by a resource unspecified field 500. On the contrary, among the fields included in the PPDU, a field by which the STA can perform decoding by knowing whether the resource allocated to the STA is the virtual allocation resource or the BTU and/or the STU may be expressed by a resource specified field 540.

The virtual allocation resource unit for transmitting the resource unspecified field 500 may include a pilot tone corresponding to positions of all pilot tones of at least one BTU and at least one STU corresponding to the virtual allocation resource unit. As a specific example, the virtual allocation resource unit of 246 tones for transmitting the resource unspecified field 500 may include 18 pilot tones corresponding to positions of 18 pilot tones included in 2 BTUs and 5 STUs. In other words, a set of pilot tones of the virtual allocation resource unit of 246 tones may be the same as a set of 18 pilot tones included in the 2 BTUs and the 5 STUs corresponding to the virtual allocation resource unit of 246 tones.

For example, the resource unspecified field 500 may be a training field transmitted before a signal field (e.g., a high efficiency (HE)-signal (SIG)) 520 including information on resource allocation (or scheduling) (for example, HE-LTF if the HE-LTF is transmitted before the signaling field 520). The virtual allocation resource unit for transmitting the training field may include 18 pilot tones.

The virtual allocation resource unit for transmitting the resource specified field 540 may include a pilot tone corresponding to some pilot tones among all pilot tones of at least one BTU and at least one STU corresponding to the virtual allocation resource unit. As described above in FIG. 2 and FIG. 3, the virtual allocation resource unit of 246 tones for transmitting the resource specified field 540 may include 8 pilot tones corresponding to positions of 8 pilot tones among 18 pilot tones included in 2 BTUs and 5 STUs.

For example, the resource specified field 540 may be a data field transmitted after the signal field 520 including the information on the resource allocation (or scheduling). The virtual allocation resource unit for transmitting the data field may include 8 pilot tones.

Figure 6:
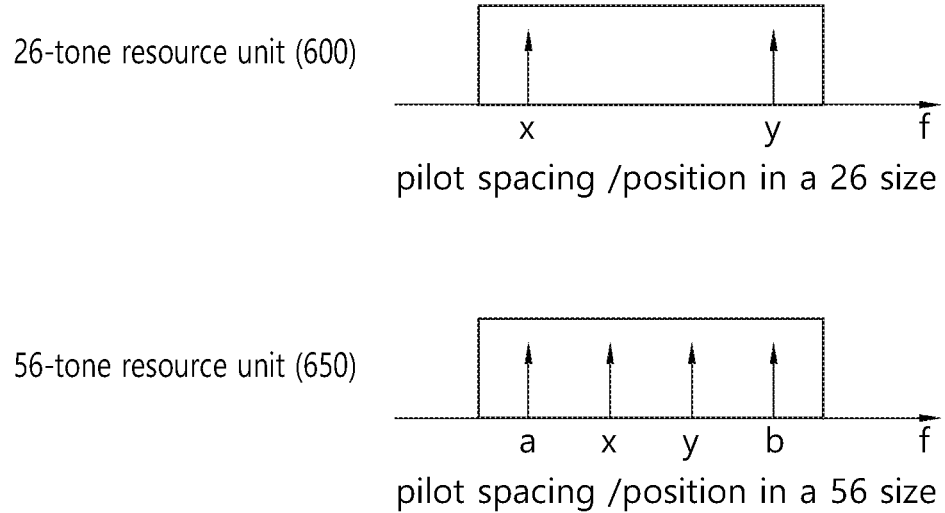
FIG. 6 is a conceptual view illustrating a method of allocating a pilot tone according to an embodiment of the present invention.

FIG. 6 is a conceptual view illustrating a method of allocating a pilot tone according to an embodiment of the present invention.

In FIG. 6, pilot allocation is disclosed in a resource unit having two different sizes for supporting a single OFDMA resource allocation structure. More specifically, a method of allocating a pilot tone and a data tone is disclosed for a 56-tone resource unit (BTU) 650 and a 26-tone resource unit (or STU) 600, respectively.

A pilot tone for the 56-tone resource unit 650 may be determined by considering an allocation position and the number of pilot tones/data tones based on a 56-tone numerology used in the existing IEEE 802.11ac.

The allocation position and the number of pilot tones/data tones based on the 56-tone numerology used in the existing IEEE 802.11ac are disclosed in 22.3.10.10 Pilot subcarriers of IEEE Standard for Information technology telecommunications and information exchange between systems local and metropolitan area networks specific requirements 'Part 11: Wireless LAN Medium Access Control (MAC) and Physical Layer (PHY) Specifications Amendment 4: Enhancements for Very High Throughput for Operation in Bands below 6 GHz.

The 26-tone resource unit 600 may be determined by considering an allocation position and the number of pilot tones/data tones based on a 26-tone numerology used in the existing IEEE 802.11ah.

The allocation position and the number of pilot tones/data tones based on the 26-tone numerology used in the existing IEEE 802.11ah are disclosed in 24.3.9.10 Pilot subcarriers of IEEE P802.11a™/D5.0 Draft Standard for Information technology telecommunications and information exchange between systems Local and metropolitan area network specific requirements 'Part 11: Wireless LAN Medium Access Control (MAC) and Physical Layer (PHY) SpecificationsAmendment 2: Sub 1 GHz License ExemptOperation'.

Referring to FIG. 6, a pilot tone may be located at [x y] in the 26-tone resource unit 600. [x y] may be determined such that an interval between pilot tones has 14 tones. That is, [x y] may be set such that a pilot tone spacing corresponds to 14 tones. For example, a tone located at a $7^{th}$ position in a direction of increasing a frequency with respect to a specific tone may be defined as a $1^{st}$ pilot tone, and a tone located at a $7^{th}$ position in a direction of decreasing the frequency may be defined as a $2^{nd}$ pilot tone. In this case, [x y] may be [−7 +7] with respect to the specific tone.

The pilot tone may be located at [a x y b] in the 56-tone resource unit 650. [a x y b] may be determined such that an interval between pilot tones has 14 tones. More specifically, a pilot tone interval of a and x, a plot tone interval of x and y, and a pilot tone interval of y and b may corresponding to 14 tones. For example, tones located at $7^{th}$ and $21^{st}$ positions in a direction of increasing a frequency with respect to a specific tone may be defined respectively as $1^{st}$ and $2^{nd}$ second pilot tones, and tones located at $7^{th}$ and $21^{st}$ positions in a direction of decreasing the frequency may be defined respectively as $3^{rd}$ and $4^{th}$ pilot tones. In this case, [a x y b] may be [−21 −7 +7 +21] with respect to the specific tone.

Figure 7:
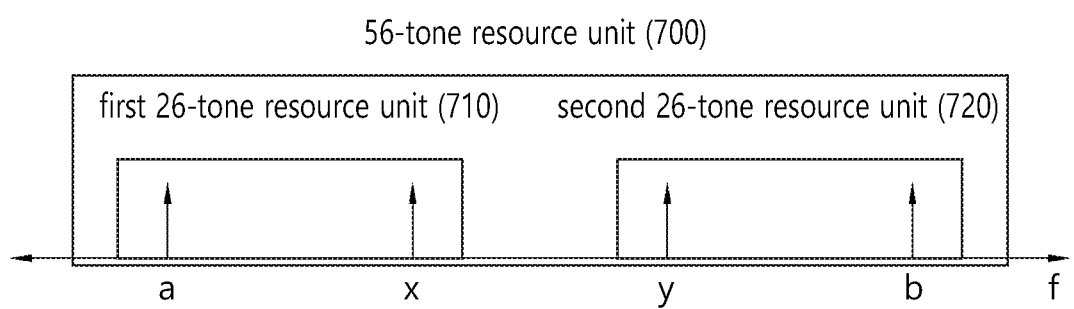
FIG. 7 is a conceptual view illustrating a method of allocating a pilot tone according to an embodiment of the present invention.

FIG. 7 is a conceptual view illustrating a method of allocating a pilot tone according to an embodiment of the present invention.

In FIG. 7, pilot allocation is disclosed in a resource unit having two different sizes for supporting a single OFDMA resource allocation structure. In particular, allocation of a pilot tone is disclosed when a 56-tone resource unit is allocated by being divided into two 26-tone resource units and four leftover tones. In addition, allocation of a pilot tone is disclosed when the two 26-tone resource units and an additional leftover tone are combined to be allocated as a 56-tone resource unit.

Positions of two 26-tone resource units generated by dividing the 56-tone resource unit may be allocated by considering a position of a pilot tone in the 56-tone resource unit. In addition, if the two 26-tone resource units and the additional leftover tone are combined to be allocated as the 56-tone resource unit, a position of a pilot tone for the 56-tone resource unit may be allocated by considering a position of a pilot tone in the 26-tone resource unit constituting the 56-tone resource unit.

Referring to FIG. 7, one 56-tone resource unit 700 fixed on a frequency axis may be divided into two 26-tone resource units 710 and 720 fixed on the frequency axis. In other words, the 56-tone unit 700 fixed on the frequency axis may be virtually allocated to the two 26-tone units 710 and 720 fixed on the frequency axis. Such a resource unit division may be performed when there is a need to allocate resources for a plurality of STAs.

If a position of a pilot tone of the 56-tone resource unit 700 is [a x y b], a position of a pilot tone of the $1^{st}$ 26-tone resource unit 710 generated by dividing the 56-tone resource unit may be [a x], and a position of a pilot tone of the $2^{nd}$ 26-tone resource unit 720 may be [y b]. In this case, as described above, [a, x, y, b] may be [−21, −7, +7, +21] with respect to the specific tone. That is, even if the 56-tone resource unit 700 is divided and used, a pilotspacing and/or a pilot position may be maintained in the 56-tone resource unit 700. In addition, from a perspective of the 26-tone resource units 710 and 720, a pilotspacing and/or a pilot position of the 26-tone resource units 710 and 720 may also be maintained on the basis of the pilot tones allocated to [a x] and [y b].

That is, in the pilot tone allocation method according to the embodiment of the present invention, even if the 56-tone resource unit 700 is divided, not only the pilotspacing and pilot position of one 56-tone resource unit 700 but also the pilotspacing and/or pilot position of the 26-tone resource units 710 and 720 may be maintained.

On the contrary, if the two 26-tone resource units 710 and 720 and an additional leftover tone are combined and allocated as the 56-tone resource unit 700, a pilotspacing and/or pilot position of the two 26-tone resource units 710 and 720 may be maintained.

For example, if a position of a pilot tone of the $1^{st}$ 26-tone resource unit 710 is [a x] and a position of a pilot tone of the $2^{nd}$ 26-tone resource unit 720 is [y b], a position of a pilot tone of the 56-tone resource unit 700 may be [a x y b]. From a perspective of the individual 26-tone resource units 710 and 720, [a x]=[−7 +7] and [b y]=[−7 +7] may be satisfied. In addition, from a perspective of the 56-tone resource unit 700, [a x y b] may be [−21, −7, +7, +21].

That is, even if the 26-tone resource units 710 and 720 are combined to constitute the 56-tone resource unit 700, not only a pilotspacing and pilot position of the 26-tone resource units 710 and 720 but also a pilotspacing and/or pilot position of the 56-tone resource unit 700 may be maintained.

Figure 8:
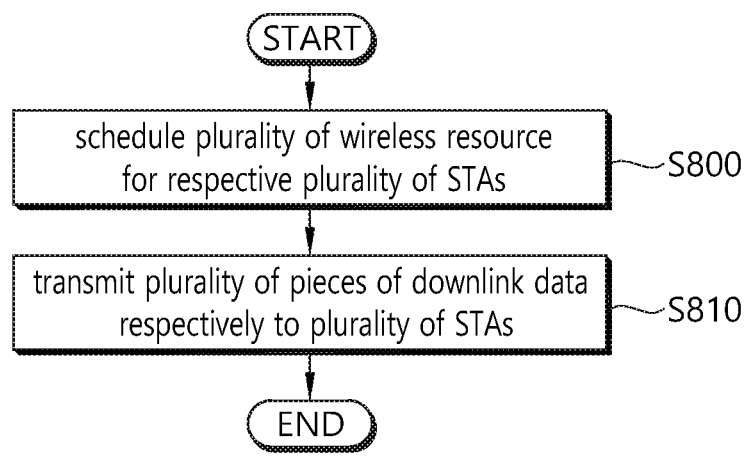
FIG. 8 is a flowchart illustrating a scheduling method of a wireless resource according to an embodiment of the present invention.

FIG. 8 is a flowchart illustrating a scheduling method of a wireless resource according to an embodiment of the present invention.

In FIG. 8, a method of scheduling a wireless resource by an AP on the basis of a BTU and/or an STU is disclosed.

The AP schedules each of a plurality of wireless resources for communication with a plurality of STAs on a bandwidth (step S800).

For example, each of the plurality of wireless resources may be one of a first resource unit, a second resource unit, a combination of the first resource unit and the second resource unit, and a virtual allocation resource unit.

The virtual allocation resource unit may be a combination of at least one first resource unit and at least one second resource unit including a plurality of data tones that can be interleaved by one interleaver.

If at least one wireless resource among the plurality of wireless resources is the virtual allocation resource unit, a set of positions of a plurality of first pilot tones included in the virtual allocation resource unit may be included in a set of positions of a plurality of second pilot tones included in at least one first resource unit and at least one second resource unit constituting the virtual allocation resource unit.

As described above, each of the at least one first resource unit constituting the virtual allocation resource unit may be a BTU corresponding to 56 tones including 52 data tones and 4 second pilot tones. The 4 second pilot tones may include 2 even index pilot tones located at an even position with respect to a specific tone and 2 odd index pilot tones located at an odd position with respect to the specific tone.

In addition, each of the at least one second resource unit constituting the virtual allocation resource unit may be an STU corresponding to 26 tones including 24 data tones and 2 second pilot tones. The 2 second pilot tones may include 1 even index pilot tone located at an even position with respect to a specific tone and 1 odd index pilot tone located at an odd position with respect to the specific tone.

In the above case, the positions of the plurality of first pilot tones included in the virtual allocation resource unit may be the same as positions of 2 even index pilot tones of each of at least one first resource unit constituting the virtual allocation resource unit and the position of 1 even index pilot tone of each of the remaining second resource units except 1 second resource unit among at least 1 second resource unit constituting the virtual allocation resource unit.

Alternatively, the positions of the plurality of first pilot tones included in the virtual allocation resource unit may be the same as positions of 2 odd index pilot tones of each of at least one first resource unit constituting the virtual allocation resource unit and the position of 1 odd index pilot tone of each of the remaining second resource units except 1 second resource unit among at least one second resource unit constituting the virtual allocation resource unit.

In addition, according to an embodiment of the present invention, if a resource unspecified field is transmitted through the virtual allocation resource unit, positions of a plurality of first pilot tones included in the virtual allocation resource unit may be the same as positions of a plurality of second pilot tones included in at least one first resource unit and at least one second resource unit constituting the virtual allocation resource unit.

In addition, according to an embodiment of the present invention, if a resource specified field is transmitted through the virtual allocation resource unit, positions of a plurality of first pilot tones included in the virtual allocation resource unit may be the same as positions of some second pilot tones among a plurality of second pilot tones included in at least one first resource unit and at least one second resource unit constituting the virtual allocation resource unit.

The resource unspecified field may be a field transmitted before a signal field including allocation information for the virtual allocation resource unit, and the resource specified field may be a field transmitted after the signal field.

The AP transmits a plurality of pieces of downlink data respectively to the plurality of STAs respectively through a plurality of wireless resources (step S810).

The plurality of pieces of downlink data (or downlink PPDU) may be transmitted respectively to the plurality of STAs respectively through the plurality of wireless resources scheduled in step S800.

Figure 9:
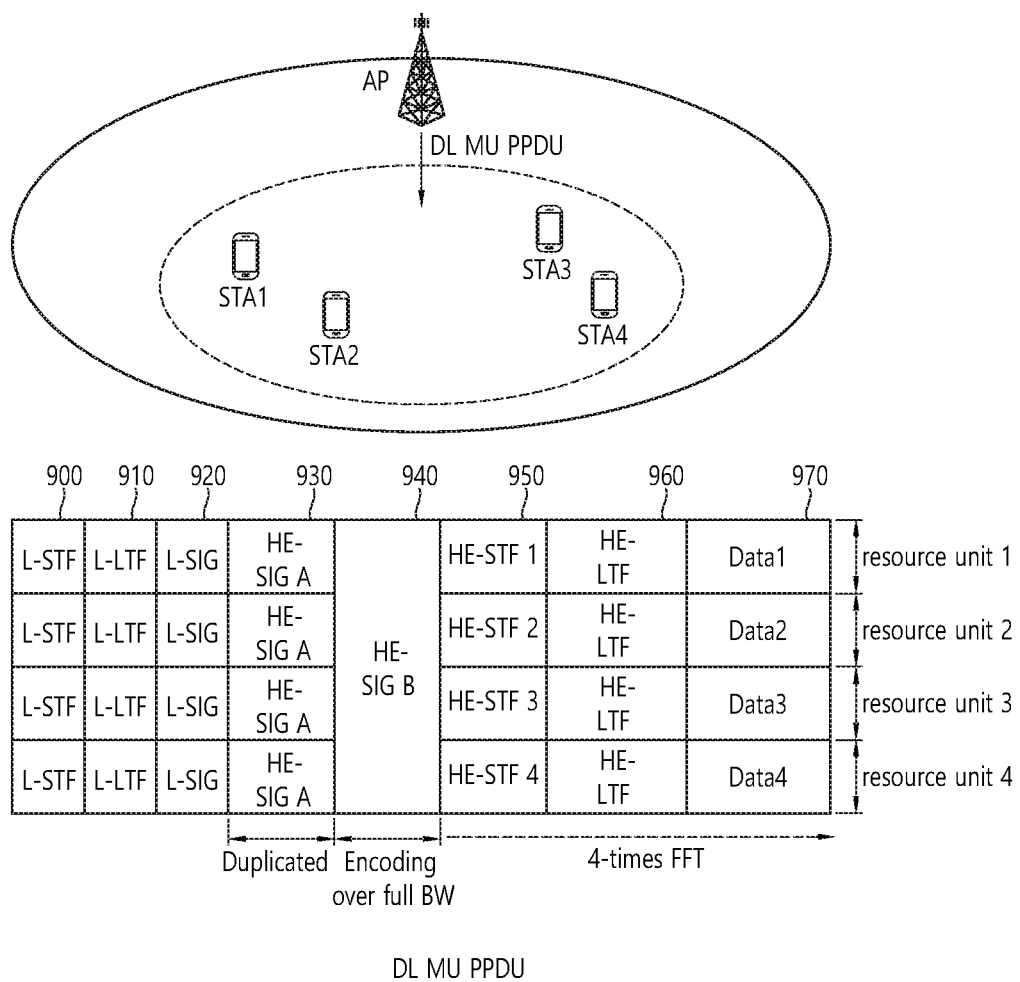
FIG. 9 is a conceptual view illustrating a downlink (DL) multi-user (MU) PPDU format according to an embodiment of the present invention.

FIG. 9 is a conceptual view illustrating a DL MU PPDU format according to an embodiment of the present invention.

In FIG. 9, a DL MU PPDU format transmitted based on OFDMA by an AP is disclosed according to the embodiment of the present invention.

Referring to an upper portion of FIG. 9, a PHY header of a DL MU PPDU may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), and a data field (or a MAC payload). The PHY header may be divided into a legacy part before the L-SIG and a high efficiency (HE) part after the L-SIG.

An L-STF 900 may include a short training orthogonal frequency division multiplexing (OFDM) symbol. The L-STF 900 may be used for frame detection, automatic gain control (AGC), diversity detection, and coarse frequency/time synchronization.

An L-LTF 910 may include a long training OFDM symbol. The L-LTE 910 may be used for fine frequency/time synchronization and channel prediction.

An L-SIG 920 may be used to transmit control information. The L-SIG 920 may include information for a data rate and a data length.

An HE-SIG A 930 may include information for indicating an STA for receiving a DL MU PPDU. For example, the HE-SIG A 930 may include an identifier of a specific STA (or AP) for receiving the PPDU and information for indicating a group of the specific STA. Further, if the DL MU PPDU is transmitted based on orthogonal frequency division multiple access (OFDMA) or multiple input multiple output (MIMO), the HE-SIG A 930 may also include resource allocation information for receiving the DL MU PPDU of the STA.

Further, the HE-SIG A 930 may include color bits information for BSS identification, bandwidth information, a tail bit, a CRC bit, modulation and coding scheme (MCS) information for an HE-SIG B 940, symbol count information for the HE-SIG B 940, and cyclic prefix (CP) (or guard interval (GI)) length information.

The HE-SIG B 940 may include a length of physical layer service data unit (PSDU) for each STA, information regarding modulation and coding scheme (MCS), a tail bit, or the like. Further, the HE-SIG B 940 may include information for the STA for receiving the PPDU and OFDMA-based resource allocation information (or MU-MIMO information). If the OFDMA-based resource allocation (or MU-MIMO related information) is included in the HE-SIG B 940, resource allocation information may not be included in the HE-SIG A 930.

An HE-SIG A 950 or an HE-SIG B 960 may include resource allocation information (or virtual resource allocation information) for each of the plurality of STAs or resource allocation information such as information regarding whether resource allocation is performed by using only a BTU or an STU.

A field prior to the HE-SIG B 940 on the DL MU PPDU may be transmitted in a duplicated form in each of different transmission resources. In case of the HE-SIG B 940, the HE-SIG B 940 transmitted in some subchannels (e.g., subchannel 1, subchannel 2) may be an independent field containing individual information, and the HE-SIG B 940 transmitted in the remaining subchannels (e.g., subchannel 3, subchannel 4) may have a format in which the HE-SIG 940 transmitted in other subchannels (e.g., subchannel 1, subchannel 2)) is duplicated. Alternatively, the HE-SIG B 940 may be transmitted on all transmission resources in an encoded form. A field next to the HE-SIG B 940 may include individual information for each of the plurality of STAs for receiving the PPDU.

The HE-STF 950 may be used to improve automatic gain control estimation in an MIMO environment or an OFDMA environment.

More specifically, an STA1 may receive an HE-STF1 transmitted through a resource unit1 from the AP, and may decode a data field1 by performing synchronization, channel tracking/prediction, and AGC. Similarly, an STA2 may receive an HE-STF2 transmitted through a resource unit2 from the AP, and may decode a data field2 by performing synchronization, channel tracking/prediction, and AGC. An STA3 may receive an HE-STF3 transmitted through a resource unit3 from the AP, and may decode a data field3 by performing synchronization, channel tracking/prediction, and AGC. An STA4 may receive an HE-STF4 transmitted through a resource unit4 from the AP, and may decode a data field4 by performing synchronization, channel tracking/prediction, and AGC.

The HE-LTF 960 may be used to estimate a channel in the MIMO environment or the OFDMA environment.

A size of IFFT applied to the HE-STF 950 and a field next to the HE-STF 950 may be different from a size of IFFT applied to a field prior to the HE-STF 950. For example, the size of IFFT applied to the HE-STF 950 and the field next to the HE-STF 950 may be four times greater than the size of IFFT applied to the field prior to the HE-STF 950. The STA may receive the HE-SIG A 930, and may be instructed to receive a downlink PPDU on the basis of the HE-SIG A 930. In this case, the STA may perform decoding on the HE-STF 950 and the field next to the HE-STF 950 on the basis of a changed FFT size. On the contrary, if the STA is not instructed to receive the downlink PPDU on the basis of the HE-SIG A 930, the STA may stop decoding and may configure a network allocation vector (NAV). A cyclic prefix (CP) of the HE-STF 950 may have a size greater than a CP of another field, and for this CP duration, the STA may perform decoding on the downlink PPDU by changing the FFT size.

An access point (AP) may allocate a plurality of wireless resources for a plurality of stations (STAs) respectively on a full bandwidth, and may transmit a physical protocol data unit (PPDU) to each of the plurality of STAs through each of the plurality of wireless resources. Allocation information of the plurality of wireless resources respectively for the plurality of STAs may be included in the HE-SIG A 930 or the HE-SIG B 930 as described above.

In this case, each of the plurality of wireless resources may be a combination of a plurality of wireless resource units (BTU, STU) having different sizes by definition on a frequency axis. As described above, the resource allocation combination may be a combination of at least one resource unit that can be allocated on all available tones depending on a bandwidth size.

Figure 10:
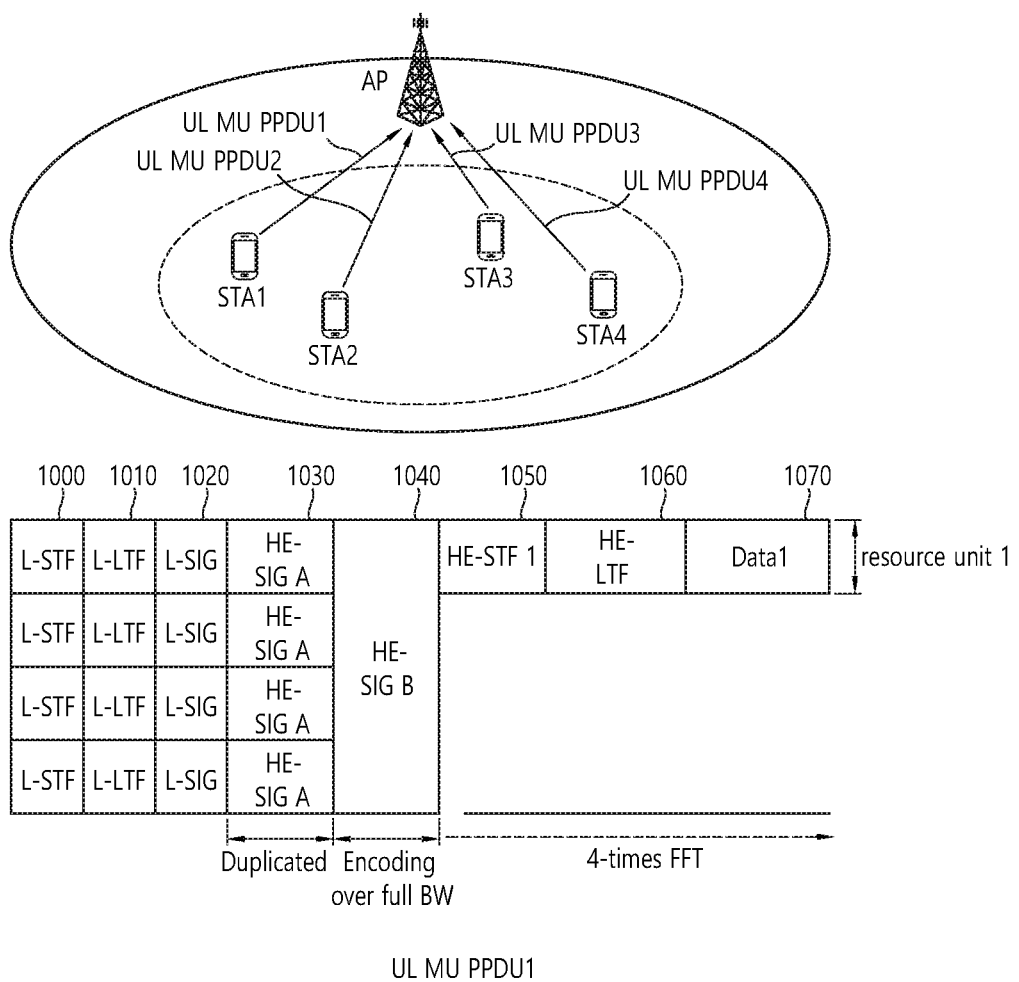
FIG. 10 is a conceptual view illustrating transmission of an uplink (UL) MU PPDU according to an embodiment of the present invention.

FIG. 10 is a conceptual view illustrating transmission of a UL MU PPDU according to an embodiment of the present invention.

Referring to FIG. 10, a plurality of STAs may transmit the UL MU PPDU on the basis of UL MU OFDMA to an AP.

An L-STF 1000, an L-LTF 1010, an L-SIG 1020, an HE-SIG A 1030, and an HE-SIG B 1040 may perform the function disclosed in FIG. 9. Information included in a signal field (the L-SIG 1020, the HE-SIG A 1030, and the HE-SIG B 1040) may be generated based on information included in a signal field of a received DL MU PPDU.

The STA1 may perform uplink transmission through a full bandwidth until the HE-SIG B 1040, and may perform uplink transmission through an allocated bandwidth starting from an HE-STF 1050. The STA1 may deliver an uplink frame on the basis of a UL MU PPDU through an allocated bandwidth (e.g., a resource unit1). An AP may allocate an uplink resource of each of a plurality of STAs on the basis of the DL MU PPDU (e.g., HE-SIG A/B). Upon allocating the uplink resource, each of the plurality of STAs may transmit the UL MU PPDU.

Figure 11:
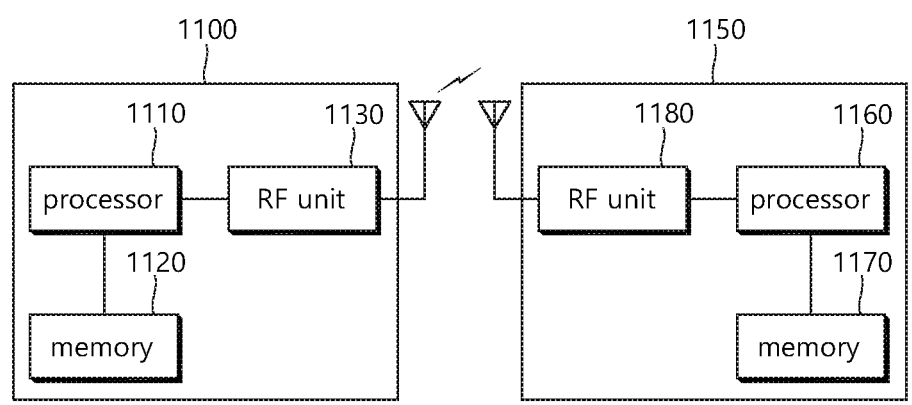
FIG. 11 is a block diagram illustrating a wireless device according to an embodiment of the present invention.

FIG. 11 is a block diagram illustrating a wireless device according to an embodiment of the present invention.

Referring to FIG. 11, a wireless device 1100 is an STA capable of implementing the aforementioned embodiment, and may be an AP 1100 or a non-AP STA (or STA) 1150.

The AP 1100 includes a processor 1110, a memory 1120, and a radio frequency (RF) unit 1130.

The RF unit 1130 may be coupled to the processor 1110 to transmit/receive a radio signal.

The processor 1110 may implement the functions, procedures, and/or methods proposed in the present invention. For example, the processor 1110 may be configured to perform an operation of the AP according to the aforementioned embodiment of the present invention. The processor may perform the operation of the AP disclosed in the embodiment of FIG. 1 to FIG. 10.

For example, the processor 1110 may be implemented to schedule each of a plurality of wireless resources for communicating with a plurality of stations (STAs) on a bandwidth, and to transmit a plurality of pieces of downlink data to each of the plurality of STAs through each of the plurality of wireless resources.

At least one wireless resource among the plurality of wireless resources may be a virtual allocation resource unit. The virtual allocation resource unit may be a combination of at least one first resource unit (e.g., BTU) and at least one second resource unit (e.g., STU) including a plurality of data tones that can be interleaved by one interleaver.

A set of positions of a plurality of first pilot tones included in the virtual allocation resource unit may be included in a set of positions of a plurality of second pilot tones included in at least one first resource unit and at least one second resource unit constituting the virtual allocation resource unit.

An STA 1150 includes a processor 1160, a memory 1170, and a radio frequency (RF) unit 1180.

The RF unit 1180 may be coupled to the processor 1160 to transmit/receive a radio signal.

The processor 1160 may implement the functions, procedures, and/or methods proposed in the present invention. For example, the processor 1160 may be configured to perform an operation of the STA according to the aforementioned embodiment of the present invention. The processor 1160 may perform the operation of the STA disclosed in the embodiment of FIG. 1 to FIG. 10.

For example, if a resource unspecified field transmitted before a signal field including resource scheduling (or resource allocation) information is transmitted on a virtual allocation resource unit, the processor 1160 may be implemented to perform decoding on a resource unspecified field on the basis of a plurality of first pilot tones. In this case, positions of the plurality of first pilot tones may be the same as positions of all pilot tones of a combination of at least one first resource unit and at least one second resource unit constituting the virtual allocation resource unit.

In addition, if a resource specified field transmitted after a signal field including resource scheduling (or resource allocation) information is transmitted on the virtual allocation resource unit, the processor 1160 may be implemented to perform decoding on the resource specified field on the basis of a plurality of second pilot tones. In this case, the positions of the plurality of second pilot tones may be the same as positions of some pilot tones among all pilot tones of a combination of at least one first resource unit and at least one second resource unit constituting the virtual allocation resource unit.

The processors 1110 and 1160 may include application-specific integrated circuits (ASICs), other chipsets, logical circuits, data processing devices, and/or converters for mutually converting a baseband signal and a radio signal. The memories 1120 and 1170 may include a read-only memory (ROM), a random access memory (RAM), a flash memory, a memory card, a storage medium and/or other storage devices. The RF units 1130 and 1180 may include at least one antenna to transmit and/or receive the radio signal.

When the above-described embodiment is implemented in software, the above-described scheme may be implemented using a module (process or function) which performs the above function. The module may be stored in the memories 1120 and 1170 may be and executed by the processors 1110 and 1160. The memories 1120 and 1170 may be disposed to the processors 1110 and 1160 internally or externally and connected to the processors 1110 and 1160 using a variety of well-known means.

What is claimed is:

1. A method for a receiving operation in a wireless local area network (WLAN), the method comprising:
receiving, from an access point (AP), a physical layer protocol data unit (PPDU) including a plurality of resource units (RUs),
wherein the plurality of RUs includes at least one of a first tone unit and/or a second tone unit,
wherein a number of tones in the first tone unit is 26, and 2 pilot tones are included in the first tone unit,
wherein the second tone unit includes a plurality of tones being greater than the first tone unit,
wherein 4 pilot tones are included in the second tone unit,
wherein the at least one of the first tone unit and/or the second tone unit is received via a frequency resource in the PPDU,
wherein for the second tone unit received via the frequency resource, frequency indexes of the 4 pilot tones are determined to be [a x y b],
wherein for the first tone unit received via the frequency resource, frequency indexes of the 2 pilot tones are determined to be one of [a x] and [y b]; and
processing the received PPDU.

2. The method of claim 1, wherein a subcarrier frequency spacing applied to the plurality RUs is 78.125 kHz.

3. The method of claim 1, wherein the PPDU is generated by the AP for a plurality of stations (STAs).

4. The method of claim 1, wherein the plurality of RUs is received based on orthogonal frequency division multiple access (OFDMA).

5. A wireless station (STA) in a wireless local area network (WLAN), comprising:

a transceiver configured to receive a radio signal from an access point (AP); and
a processor configured to control the transceiver,
wherein the processor is configured to:
receive, via the transceiver, a physical layer protocol data unit (PPDU) including a plurality of resource units (RUs),
wherein the plurality of RUs includes at least one of a first tone unit and/or a second tone unit,
wherein a number of tones in the first tone unit is 26, and 2 pilot tones are included in the first tone unit,
wherein the second tone unit includes a plurality of tones being greater than the first tone unit,
wherein 4 pilot tones are included in the second tone unit,
wherein the at least one of the first tone unit and/or the second tone unit is received via a frequency resource in the PPDU,
wherein for the second tone unit received via the frequency resource, frequency indexes of the 4 pilot tones are determined to be [a x y b],
wherein for the first tone unit received via the frequency resource, frequency indexes of the 2 pilot tones are determined to be one of [a x] and [y b]; and
process the received PPDU.

6. The STA of claim 5, wherein a subcarrier frequency spacing applied to the plurality RUs is 78.125 kHz.

7. The STA of claim 5, wherein the PPDU is generated by the AP for a plurality of stations (STAs).

8. The STA of claim 5, wherein the plurality of RUs is received based on orthogonal frequency division multiple access (OFDMA).

9. An access point (AP) in a wireless local area network (WLAN), comprising:

a transceiver configured to transmit a radio signal to a plurality of stations (STAs); and
a processor configured to control the transceiver,
wherein the processor is configured to:
generate a physical layer protocol data unit (PPDU) including a plurality of resource units (RUs),
wherein the plurality of RUs includes at least one of a first tone unit and/or a second tone unit,
wherein a number of tones in the first tone unit is 26, and 2 pilot tones are included in the first tone unit,
wherein the second tone unit includes a plurality of tones being greater than the first tone unit,
wherein 4 pilot tones are included in the second tone unit,
wherein the at least one of the first tone unit and/or the second tone unit is allocated to a frequency resource in the PPDU,
wherein for the second tone unit allocated to the frequency resource, frequency indexes of the 4 pilot tones are determined to be [a x y b],
wherein for the first tone unit allocated to the frequency resource, frequency indexes of the 2 pilot tones are determined to be one of [a x] and [y b]; and
transmit, via the transceiver, the generated PPDU.

10. The AP of claim 9, wherein a subcarrier frequency spacing applied to the plurality RUs is 78.125 kHz.

11. The AP of claim 9, wherein the PPDU is generated for the plurality of STAs.

12. The AP of claim 9, wherein the plurality of RUs is transmitted based on orthogonal frequency division multiple access (OFDMA).

* * * * *